Aug. 15, 1961    C. J. KIBBIE ET AL    2,996,317
PIPE JOINT
Filed July 17, 1956

INVENTORS.
Charles J. Kibbie.
James M. Thomas.
BY
Harness, Dickey & Pierce
ATTORNEYS.

United States Patent Office 2,996,317
Patented Aug. 15, 1961

2,996,317
PIPE JOINT
Charles J. Kibbie, 816 E. Elm Ave., and James M.
Thomas, 824 E. Elm Ave., both of Monroe, Mich.
Filed July 17, 1956, Ser. No. 598,303
1 Claim. (Cl. 285—231)

This invention relates to improved gaskets for use in connection with pipe joints, particularly of the bell and spigot type, and to improved methods of making bell and spigot pipe joints.

Bell and spigot joints of soil pipe and the like are commonly sealed with molten lead, after first being packed with oakum or hemp to keep the liquid lead from entering the pipe as it is poured. This method of sealing pipe joints has many disadvantages among which are the trouble and expense of maintaining a supply of molten lead in a sufficiently clean condition; the difficulty of securing a uniform seal between hot lead and cold iron (or other pipe material); the difficulty of pouring the lead and causing it to flow properly into the hub of the pipe joint when the pipe is in a horizontal position; the tendency of oakum and hemp, or other packing materials to deteriorate upon aging, and to disintegrate and fall into the pipe; and the relative rigidity of a lead seal, which may be broken by relatively slight movements of the joined pieces of pipe. Moreover, a considerable degree of skill and a relatively long time are required to make and test a hot lead seal.

Accordingly, one important object of the present invention is to provide improved sealing means for joining bell and spigot pipe sections such as soil pipe sections.

Another object is to provide an improved method of making bell and spigot pipe joints.

A further object is to provide an improved gasket assembly of low cost, which is capable of firmly and permanently sealing bell and spigot pipe joints, while at the same time leaving the joint flexible to permit a relatively high degree of relative movement between the joined pieces of pipe without breaking the seals.

These and other objects are accomplished according to the present invention, one embodiment of which comprises a two-piece gasket assembly including a gasket sleeve and an annular wedge, both being provided with annular, axially projecting, gripping ridges, or shoulders for positive pressure engagement with both the outer surface of the spigot and the inner surface of the bell of the pipe joint. The sleeve and the wedge are preferably made of a flexible, resilient material such as a molded vinyl chloride plastisol.

The invention will be described in greater detail in connection with the accompanying drawing of which:

Figure 1:
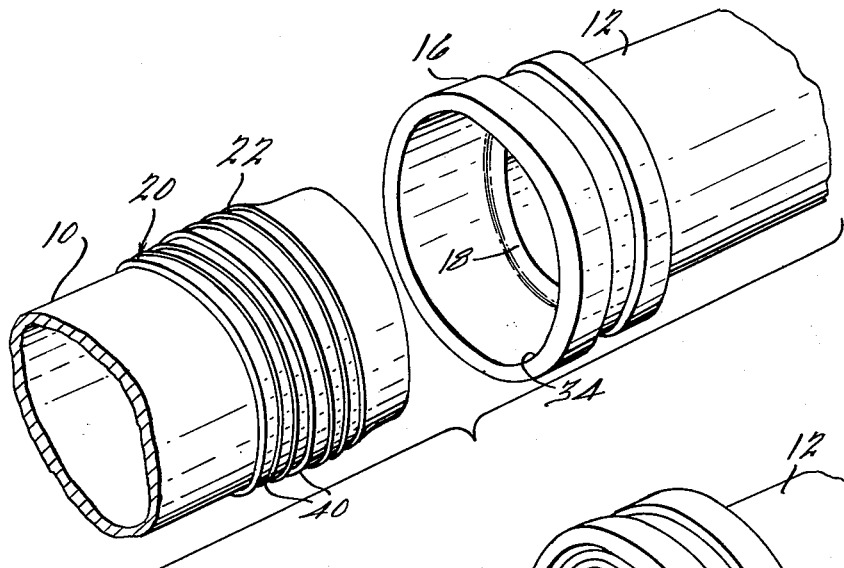
FIGURE 1 is a fragmentary perspective view of bell and spigot pipe sections including a gasket assembly fitted on the spigot section according to the invention preparatory to completing a seal.
Figure 2:
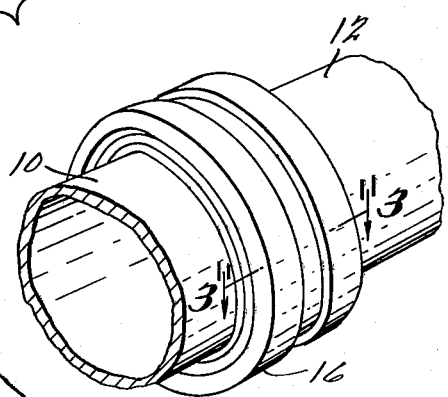
FIG. 2 is a fragmentary, perspective view of an assembled pipe joint according to the invention.

Referring now to the drawing, there are shown the mating portions 10 and 12, respectively, of two pipe sections, the spigot 10 facing and being adapted to be loosely fitted into the bell 16 of the pipe section 12.

Figure 3:
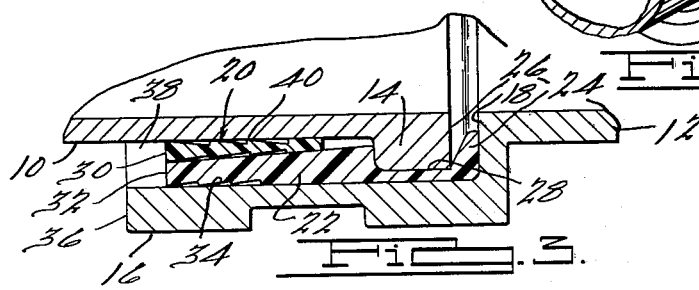
FIG. 3 is a cross-sectional view of the pipe joint shown in FIG. 2, taken along the section line 3—3 thereof.
Figure 4:
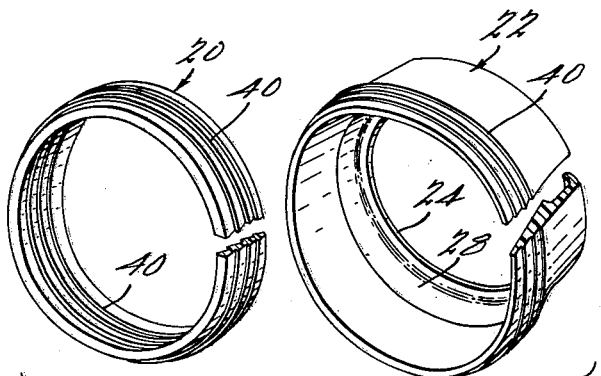
FIG. 4 is a fragmentary, perspective view of a gasket sleeve and a wedge therefor according to the invention.

A sealing gasket assembly according to the present invention includes a flexible, resilient, annular wedge portion 20 of axially tapering cross section. This wedge 20 is fitted over the spigot 10 and along the length of the spigot a short distance, the thinnest part of the wedge 20 extending toward the face 26 of the spigot. The gasket assembly also includes a sleeve portion 22 adapted to fit snugly around the spigot 10, and including at one end an inturned flange 24 positioned to engage the face 26 of the spigot. The spigot 10 as shown includes an annular, reinforcing, terminal flange 14 (FIG. 3) which is utilized to assist in retaining the sleeve 22 against axial displacement. If the spigot 10 is not provided with such an integral flange, as may be the case when it is cut short, an additional gasket member (not shown) is preferably first applied to the spigot to take the place of the flange 14. The sleeve 22 includes an internal, radially extending recess 28 shaped to accommodate the flange 14 when the sleeve 22 is in place on the spigot 10.

Annular retaining shoulders, or ridges 40 are formed on both the inner and outer surfaces of the wedge 20 to provide tight, biting type gripping engagement between the wedge 20 and the spigot 10 and the sleeve 22. Similar ridges 40 are provided on the outer surface of the sleeve 22 for tight gripping engagement with the interior surface 34 of the bell 16. These ridges 40 also increase the radial compressibility of the wedge 20 and the sleeve 22 when the seal is assembled, and serve to limit axial movement of the assembled parts.

The sleeve 22 is fitted upon the spigot 10 following the wedge 20. The spigot flange 14 fits into the sleeve recess 28, and the inturned sleeve flange 24 is brought into abutment with the spigot face 26. The sleeve 22 is thus retained in place on the spigot 10 and held against axial displacement. The wedge 20 is then introduced between the sleeve 22 and the spigot 10 completely around its circumference, and forced a relatively small distance axially into the sleeve 22, stretching the sleeve slightly and forcing it radially outwardly. The spigot 10 with the gasket assembly upon it is then thrust into the bell 16, and the wedge 20 is driven completely into the sleeve 22, and the outer face 30 of the wedge 20 being made flush with the outer face 32 of the sleeve 22. The wedge 20 may be driven home by any desired blunt instrument, pressing alternately at angularly spaced positions around the circumference thereof.

The wedging action compresses both the wedge 20 and the sleeve 22, forcing the wedge 20 into tight sealing engagement both with the spigot 10 and with the inner, annular surface of the sleeve 22, and forcing the outer surface of the sleeve into tight sealing engagement with the inner surface 34 of the bell 16. This substantially completes the joint which is permanent, yet resilient and relatively flexible.

The sleeve portion 22 is preferably made substantially shorter than the internal length of the bell 16 so that if additional sealing means is required by local ordinances or building codes, a layer of molten lead or other sealing material may be laid in the end space 38 between the bell 16 and the spigot 10 adjacent to the faces 30 and 32 of the gasket assembly.

The wedge portion 20 is relatively short, and when driven fully home, as described, extends axially from the face 32 of the sleeve only a relatively short distance, stopping short of the reinforcing flange 14. Typical approximate dimensions of a gasket assembly according to the invention adapted for sealing conventional four inch cast iron soil pipe sections are:

| | Inches |
|---|---|
| Lenth of sleeve 22 | 2½ |
| Inside diameter of sleeve 22 at face 32 | 4¾ |
| Length of wedge 20 | 1 |
| Thickness of wedge 20 at face 30 | ¼ |
| Thickness of wedge 20 at thin end | 1/16 |

These dimensions may, of course, be varied as desired and as required to fit bell and spigot pipe joints of different dimensions.

Both the wedge and the sleeve are preferably made of a vinyl chloride plastisol, which materials have exceptional aging characteristics and may be cured readily to a tough elastomeric form that retains its resilient properties over a relatively wide temperature range, and is highly resistant to corrosion. A fungicide may be included in the plastisol to inhibit plant growth and the entrance of roots and the like into the pipe joint when the pipe joint is buried in the ground.

Molded polyvinyl chloride plastisols are relatively unaffected by heat and cold, and retain their resilience through a wide temperature range. The seal assemblies are not damaged, for example, when molten lead is poured over them after they are assembled in a pipe joint, and they retain substantial flexibility at temperatures as low as minus 50° F. These materials are also highly advantageous in their resistance to moisture, rot, decay, vibration and the corrosive effects of strong acids and alkalies.

The axial forces imposed upon the wedge 20 when it it drive home are transmitted in some measure to the spigot 10 to lightly compress the flange portion 24 between the face 26 of the spigot and the shoulder 18 of the bell, and to form an additional seal at the flange 24.

Pipe joint sealing gaskets according to the present invention may be simply and quickly installed, with a resulting substantial saving in labor costs. Their installation requires only a minimum degree of skill, and they may be tested immediately after installation and under any desired temperature conditions. They effectively overcome the hereinabove listed disadvantages of conventional hot lead seals.

There have thus been described improved pipe joint sealing gaskets of relatively simple design, which are particularly advantageous for use in bell and spigot pipe joints in soil pipe and the like. The gaskets are inexpensive to manufacture and easy to install, have a relatively long service life, are highly resistant to adverse conditions of use, and remain flexible and pressure-tight through a wide temperature range.

What is claimed is:

A bell and spigot pipe joint sealing assembly comprising a pipe having an enlarged bell on one end thereof, a spigot having a terminal flange on one end thereof, a flexible sleeve made of a resiliently yieldable, non-metallic material having an internal groove adjacent to one end thereof and an in-turned flange integral therewith forming the end wall of said groove, said sleeve being disposed over said one end of the spigot with the internal groove snugly receiving said terminal flange, said bell being disposed over said sleeve with the internal shoulder of the bell compressing said in-turned flange of the sleeve against the face of the spigot, said sleeve having radially projecting circumferential ribs formed in its outer surface near the end thereof opposite from said groove, an annular wedge made of resiliently yieldable, non-metallic material positioned between the sleeve and the spigot upon which the sleeve is fitted, said wedge having an axially tapering thickness to facilitate wedging insertion thereof between the sleeve and spigot and having radially projecting circumferential ribs on both the inner and outer surfaces thereof, said wedge ribs and sleeve ribs being of angular section and each having a gradually tapered side and a sharply tapered side with the sharply tapered side facing in a direction away from said one end of the sleeve to provide a frictional retaining engagement with the spigot and the sleeve and the wall of the bell for resisting retraction of the wedge out of its operative position and axial movement of the sleeve out of the bell, said ribs also serving to provide increased compressibility of said sleeve and of said wedge and thus facilitating the assembly of the sleeve and the wedge in in the pipe joint.

References Cited in the file of this patent

UNITED STATES PATENTS

| | | |
|---|---|---|
| 634,848 | Courson | Oct. 10, 1899 |
| 1,958,011 | Moore | May 8, 1934 |
| 2,021,745 | Pfefferle et al. | Nov. 19, 1935 |
| 2,116,705 | Marx et al. | May 10, 1938 |
| 2,271,777 | Nathan | Feb. 3, 1942 |
| 2,271,936 | Carson | Feb. 3, 1942 |
| 2,272,811 | Nathan | Feb. 10, 1942 |
| 2,272,812 | Neal | Feb. 10, 1942 |
| 2,501,943 | Jack | Mar. 28, 1950 |

FOREIGN PATENTS

| | | |
|---|---|---|
| 424,233 | Great Britain | Feb. 18, 1935 |